US009563608B1

(12) United States Patent
Ashtiani et al.

(10) Patent No.: US 9,563,608 B1
(45) Date of Patent: Feb. 7, 2017

(54) DATA ANALYSIS RESULTS AUTHORING AND PEER REVIEW

(71) Applicant: International Business Machines Corporation, Armonk, NY (US)

(72) Inventors: Behrooz Ashtiani, Thornhill (CA); T. Alan Keahey, Chicago, IL (US); Daniel J. Rope, Reston, VA (US); Graham J. Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/010,590

(22) Filed: Jan. 29, 2016

(51) Int. Cl.
*G06F 17/27* (2006.01)
*G06F 17/21* (2006.01)
*G06F 17/22* (2006.01)
*G06T 11/20* (2006.01)
*G06F 3/0484* (2013.01)
*G06F 17/24* (2006.01)
*G06F 3/0482* (2013.01)

(52) U.S. Cl.
CPC ......... *G06F 17/2211* (2013.01); *G06F 3/0482* (2013.01); *G06F 3/04842* (2013.01); *G06F 17/24* (2013.01); *G06F 17/2765* (2013.01); *G06T 11/206* (2013.01)

(58) Field of Classification Search
CPC .. G06F 17/28; G06F 17/2705; G06F 17/2735; G06F 17/274; G06F 17/27; G06F 17/21; G06F 17/30684; G06F 17/24; G06F 17/2881; G06F 17/30253
USPC ....................................................... 704/9, 10
See application file for complete search history.

(56) References Cited

U.S. PATENT DOCUMENTS

| 5,772,446 A * | 6/1998 | Rosen ...................... G09B 5/02 434/307 R |
| 6,254,395 B1 * | 7/2001 | Breland ................. G09B 19/06 434/156 |
| 6,990,628 B1 * | 1/2006 | Palmer ................ G06F 17/2211 707/999.003 |
| 7,120,622 B2 * | 10/2006 | Zellweger ............. G06F 17/211 |
| 7,694,222 B2 * | 4/2010 | Steen ..................... G06F 17/274 715/234 |

(Continued)

OTHER PUBLICATIONS

U.S. Appl. No. 14/931,537, filed Nov. 3, 2015 by Daniel J. Rope et al.

(Continued)

*Primary Examiner* — Edgar Guerra-Erazo
(74) *Attorney, Agent, or Firm* — Shumaker & Sieffert, P.A.

(57) ABSTRACT

Techniques are described for a real-time visualization of data in an integrated authoring environment. In one example, a method includes receiving text information. The method also includes comparing the dynamically entered text information against a data source, wherein the comparing comprises applying natural language processing (NLP) to determine one or more assertion statements in the text information that references data from the data source. The method also includes retrieving the referenced data associated with the one or more assertion statements from the data source. The method further includes generating a visual representation of the referenced data associated with the one or more assertion statements. The method also includes displaying the visual representation, wherein the visual representation is integrated with an authoring interface.

17 Claims, 5 Drawing Sheets

(56) References Cited

U.S. PATENT DOCUMENTS

| | | | |
|---|---|---|---|
| 7,717,712 B2 * | 5/2010 | Brun | G06F 17/274 434/156 |
| 8,185,448 B1 | 5/2012 | Myslinski | |
| 9,015,037 B2 | 4/2015 | Myslinski | |
| 2002/0124048 A1 * | 9/2002 | Zhou | G06F 17/30017 709/203 |
| 2004/0250209 A1 * | 12/2004 | Norcross | G06F 17/24 715/700 |
| 2005/0137843 A1 * | 6/2005 | Lux | G06F 9/4448 704/2 |
| 2006/0123329 A1 * | 6/2006 | Steen | G06F 17/248 715/270 |
| 2007/0238084 A1 * | 10/2007 | Maguire | G09B 7/02 434/353 |
| 2008/0178084 A1 * | 7/2008 | Morse | G06F 17/24 715/708 |
| 2008/0312927 A1 * | 12/2008 | Constantin | G09B 7/02 704/251 |
| 2009/0265160 A1 * | 10/2009 | Williams | G06F 17/27 704/9 |
| 2014/0114707 A1 | 4/2014 | Rope et al. | |
| 2014/0342333 A1 * | 11/2014 | Knoche | G09B 5/02 434/267 |

OTHER PUBLICATIONS

U.S. Appl. No. 14/862,562, filed Sep. 23, 2015 by T. Alan Keahey et al.

IBM, "IBM Watson: What is Watson?" IBM, Retrieved from <http://www.ibm.com/smarterplanet/us/en/ibmwatson/what-s-watson.html> on Jan. 29, 2016, 3 pgs.

* cited by examiner

DATA ANALYSIS RESULTS AUTHORING AND PEER REVIEW

TECHNICAL FIELD

This disclosure relates to textual based authoring systems.

BACKGROUND

The writing of articles or compositions based on factual data includes activities of collecting, analyzing, and disseminating news and information. An author writes articles or written compositions to discuss the news and which may contain supporting quantitative data, such as eyewitness accounts, photographs, statistics, graphs, recollections, polls, and so forth. Articles or written compositions may further include an author's conclusion or opinion based upon such data.

SUMMARY

In one aspect of the invention, a method includes receiving text information. The method also includes comparing the dynamically entered text information against a data source, wherein the comparing comprises applying natural language processing (NLP) to determine one or more assertion statements in the text information that references the data from the data source. The method also includes retrieving the referenced data associated with the assertion statements from the data source. The method further includes generating a visual representation of the referenced data associated with the one or more assertion statements. The method also includes displaying the visual representation, wherein the display is integrated with an authoring interface.

In another aspect, a computer system includes one or more processors and one or more computer-readable memories. The computer system also includes program instructions, stored on at least one of the one or more storage mediums for execution by at least one of the one or more processors via at least one of the one or more memories, to receive text information; to compare the text information against a data source, wherein the comparing comprises applying natural language processing (NLP) to determine one or more assertion statements in the text information that references data from the data source; to retrieve the referenced data associated with the one or more assertion statements from the data source; to generate a visual representation of the referenced data associated with the one or more assertion statements; and to display the visual representation, wherein the display is integrated with an authoring interface.

In another aspect, a computer program product includes a computer-readable storage medium having program code embodied therewith, the program code executable by a processor to receive text information. The computer program product also includes program code to compare the text information against a data source, wherein the comparing comprises applying natural language processing (NLP) to determine one or more assertion statements in the text information that references data from the data source. The computer program product also includes program code to retrieve the referenced data associated with the one or more assertion statements from the data source. The computer program product further includes program code to generate a visual representation of the referenced data associated with the one or more assertion statements. The computer program product also includes program code to display the visual representation, wherein the display is integrated with an authoring interface.

The details of one or more embodiments of the disclosure are set forth in the accompanying drawings and the description below. Other features, objects, and advantages of the disclosure will be apparent from the description and drawings, and from the claims.

DETAILED DESCRIPTION

Written articles, compositions, or any authored texts based on factual data may be centered on conclusions based on data analysis results. One or more tools are generally used to obtain, process, and/or analyze data, whereas a separate authoring tool is used to write the articles or compositions. Authoring an article or composition generally begins with an analysis conducted in an analytical environment, such as the web or other sources of information, prior to writing text. An author then proceeds to compose the written composition based on the data analysis in a separate authoring environment, such as a text based editor or other composition tool. As an author proceeds to write the composition, the author must repeatedly switch between the separate analytical and authoring environments.

Editors or other individuals reviewing and confirming the veracity of data and conclusions from the articles are often required to perform time-consuming, manual, and independent analysis within a separate analytical environment. For example, a reviewer in the process of reviewing the author's draft composition within the authoring environment may desire to check the veracity of statements made within the draft. To do so, the reviewer must conduct an exhaustive independent review within a separate analytical environment. However, due to time constraints, reviewers are often forced to rely on the analysis from the author's same data set and trust the conclusions and analysis of the author without conducting an independent review, thereby leading to reduced data integrity and reproducibility. This disclosure is directed generally to techniques that integrate the analytical and authoring environments to enable dynamic analysis of entered text and to provide a real-time visualization of supporting or conflicting data of the entered text.

Figure 1:
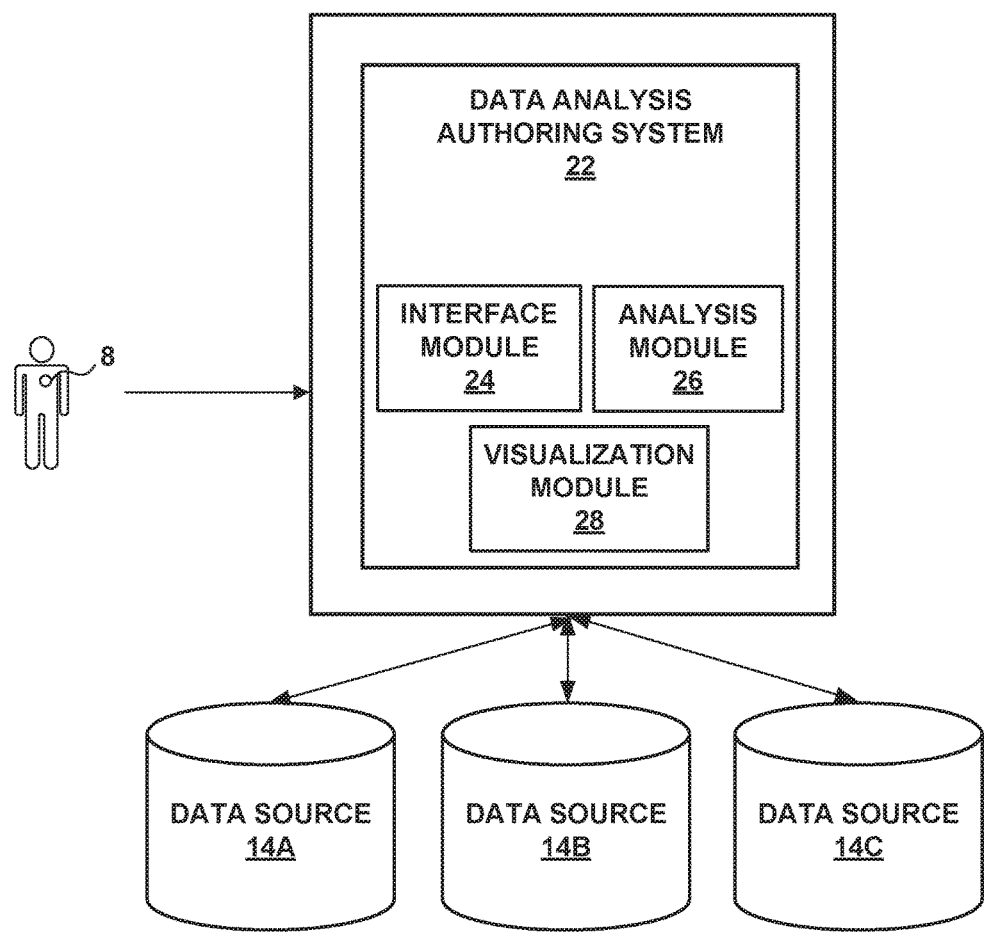
FIG. 1 depicts a block diagram of a data analysis authoring system that may perform, with one or more processors, real-time, or near-real time, visualization of supporting data of an authored article or written composition, in one aspect of the disclosure.

FIG. 1 depicts a block diagram of data analysis authoring system 22 that may perform real-time, or near-real time, visualization of supporting or conflicting data of a dynamically authored article or written composition, in one aspect of the disclosure. FIG. 1 illustrates an example context in which data analysis authoring system 22 may include an interface module 24, an analysis module 26, and a visualization module 28. Data analysis authoring system 22 may also couple to one or more data sources 14A-14C (collectively, "data sources 14") that store data such as eyewitness accounts, photographs, statistics, graphs, statements, polls, articles, books, or other references used for authoring articles or other written compositions. Data sources 14 may include at least one of a corpus, a body of works, one or more documents, one or more articles, one or more websites, and one or more data collections. Data sources 14 may be internal or external to the data analysis authoring system 22.

Users 8, such as journalists, authors, reviewers, and/or editors of written works, are generally assigned to write or review news articles or other written compositions. These articles or compositions may discuss various topics, stories, or events, and may further include a conclusion based on an analysis of data.

In the example of FIG. 1, user 8 may interact with interface module 24 of data analysis authoring system 22 to upload data, which are the subject matter for authoring or reviewing an article or composition, into data sources 14. Each of data sources 14 may include cloud storage solutions, disk drives, databases, or any form of data storage system for storing, uploading, and/or retrieving data. Data analysis authoring system 22 may retrieve, analyze, and display the uploaded data from data sources 14. In one example, each of data sources 14 may also include metadata relating to the uploaded data.

In the example of FIG. 1, interface module 24 of data analysis authoring system 22 may present an integrated authoring and analysis interface by which user 8 may enter or select text information for writing or reviewing articles. User 8 may interact with interface module 24 to enter text information, identify data sources 14, edit the text information, modify the data sources 14, or identify a predetermined threshold of statistical correctness for writing articles. For example, user 8 may desire to write a particular article relating to specific data stored in a particular data source 14. User 8, such as an author, may utilize interface module 24 to select or modify the data sources 14 for writing the particular article. User 8 may also define a predetermined threshold of statistical correctness to display only the referenced data that meets the predetermined threshold, which is described further herein. User 8, such as an editor or reviewer, may further select text information for reviewing the text information within the written articles. User 8 may interact with interface module 24 to select text information, identify different data sources 14, edit the text information, modify the data sources 14, or identify a predetermined threshold of statistical correctness for writing articles. Text information may include alphanumeric characters or other characters representative of spoken languages.

As text information is entered or selected, data analysis authoring system 22 may receive and dynamically analyze the text information for references to data from data sources 14. Data analysis authoring system 22 may include an analysis module 26 to analyze entered or selected text information, which may utilize natural language processing (NLP) techniques, such as word and phrase tokenization, text classification and sentiment analysis, and information extraction. For example, natural language processing may refer to the ability to process sentences in a natural language such as English. Analysis module 26 may analyze individual text information or a grouping of text information, such as a phrase or sentence. In one instance, analysis module 26 may use natural language processing to determine the meaning associated with the entered or selected text information. Upon determination of the meaning associated with the entered or selected text information, analysis module 26 may compare the entered or selected text information with data, including metadata, previously uploaded to data sources 14, to determine whether the entered or selected text information references the data stored within data sources 14.

Upon determining that the entered or selected text information references to data stored in data sources 14, data analysis authoring system 22 may retrieve, analyze, and display the referenced data from data sources 14. For example, data analysis authoring system 22 may utilize analysis module 26 to retrieve and analyze the data from data sources 14, such as providing one or more statistical analyses of the referenced data. A statistical analysis may include descriptive statistics that provide a concise summary of the referenced data, which include the calculation of mean, standard deviation and/or range, and inferential statistics, which include drawing conclusions from a sample of the referenced data.

Data analysis authoring system 22 may also utilize visualization module 28 to display the referenced data and/or statistical analysis of the referenced data as a graphical representation integrated with the authoring interface. Visualization module 28 may generate, for example, a graphical representation of the referenced data as a pie chart, pictograph, organizational chart, flowchart, bar graph, line graph, text, or other representation of data. Data analysis authoring system 22 may also present user 8 an interface to select the type of graphical representation of the referenced data. In another example, visualization module 28 may include a chart recommendation system for recommending a preferred graphical representation of the referenced data. In another example, user 8 may specify a predetermined threshold of statistical correctness that determines whether to display the referenced data. For example, if the referenced data is only partially related and does not meet the predetermined threshold for relevance, data analysis authoring system 22 may refrain from displaying the visualization of the referenced data. Alternatively, if the referenced data is highly related and meets the predetermined threshold for relevance, data analysis authoring system 22 may display the visualization of the referenced data.

In this way, data analysis authoring system 22 enables the automatic production of data analysis and visualizations of data referring to written statements of text information in one integrated environment, therefore allowing user 8 to efficiently write articles or written compositions in an authoring environment while dynamically analyzing the entered or selected text information in an integrated analytical environment in real-time.

Figure 2:
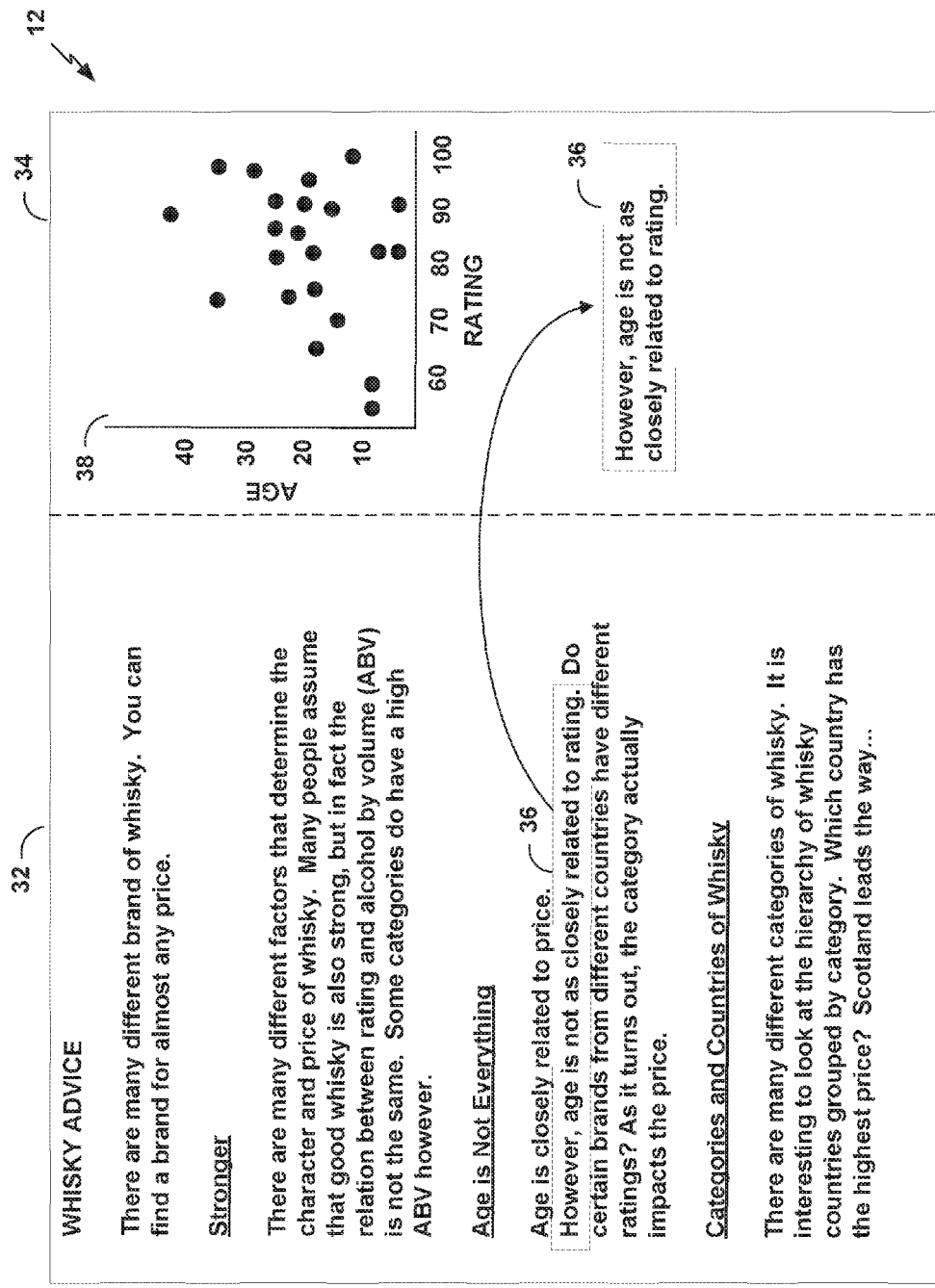
FIG. 2 is an example illustration of an integrated authoring and analytical interface, in one aspect of the disclosure.

FIG. 2 is an example illustration of an integrated authoring and analytical interface 12, in one aspect of the disclosure. Interface module 24 of data analysis authoring system 22 may comprise an integrated interface 12 that may include an authoring interface 32 and an analysis interface 34. In the example of FIG. 2, authoring interface 32 may include a text editor, word processor, web-based authoring tool, or other composition, editing, and formatting tool. User 8 may interface with authoring interface 32 to enter text information for composition of articles. As user 8 enters text information in authoring interface 32, analysis module 26 of data analysis authoring system 22 may analyze the entered text information for one or more assertion statements 36 that may alert data analysis authoring system 22 of possible references to data stored in data sources 14. Utilizing natural language processing, analysis module 26 may determine that the assertion statements 36 may refer to data associated with data stored in one of data sources 14. In response to determining assertion statements 36, data analysis authoring system 22 may trigger the generation of an automatic analysis 38 of data associated with the assertion statements 36. Data analysis authoring system 22 may also display the referenced data or analysis of the referenced data 38 within analysis interface 34.

For instance, the example in FIG. 2 illustrates a news article on "Whisky Advice" with text entered in authoring interface 32. As user 8 enters or selects text within authoring interface 32, analysis module 26 may, for example, utilize natural language processing to analyze the entered or selected text for assertion statements 36, such as the phrase: "However, age is not as closely related to rating." Analysis module 26 may determine that the above phrase may refer to data associated with whisky age and rating that is stored within data sources 14. In response, data analysis authoring system 22 may retrieve the referenced data about whisky age and rating and may further provide a statistical analysis comparing the rating of whisky with the age of whisky. For instance, analysis module 26 may generate an analysis of a whisky's rating in relation to the whisky's age.

Visualization module 28 may then generate a graphical representation of the statistical analysis 38 comparing the rating of whisky with the age of whisky in analysis interface 34. The analysis interface 34 may also integrate the generated analysis 38 with the authoring interface 32, thereby enabling user 8 to consolidate the authoring environment with the analytical environment for real-time analysis as text is entered.

Figure 3:
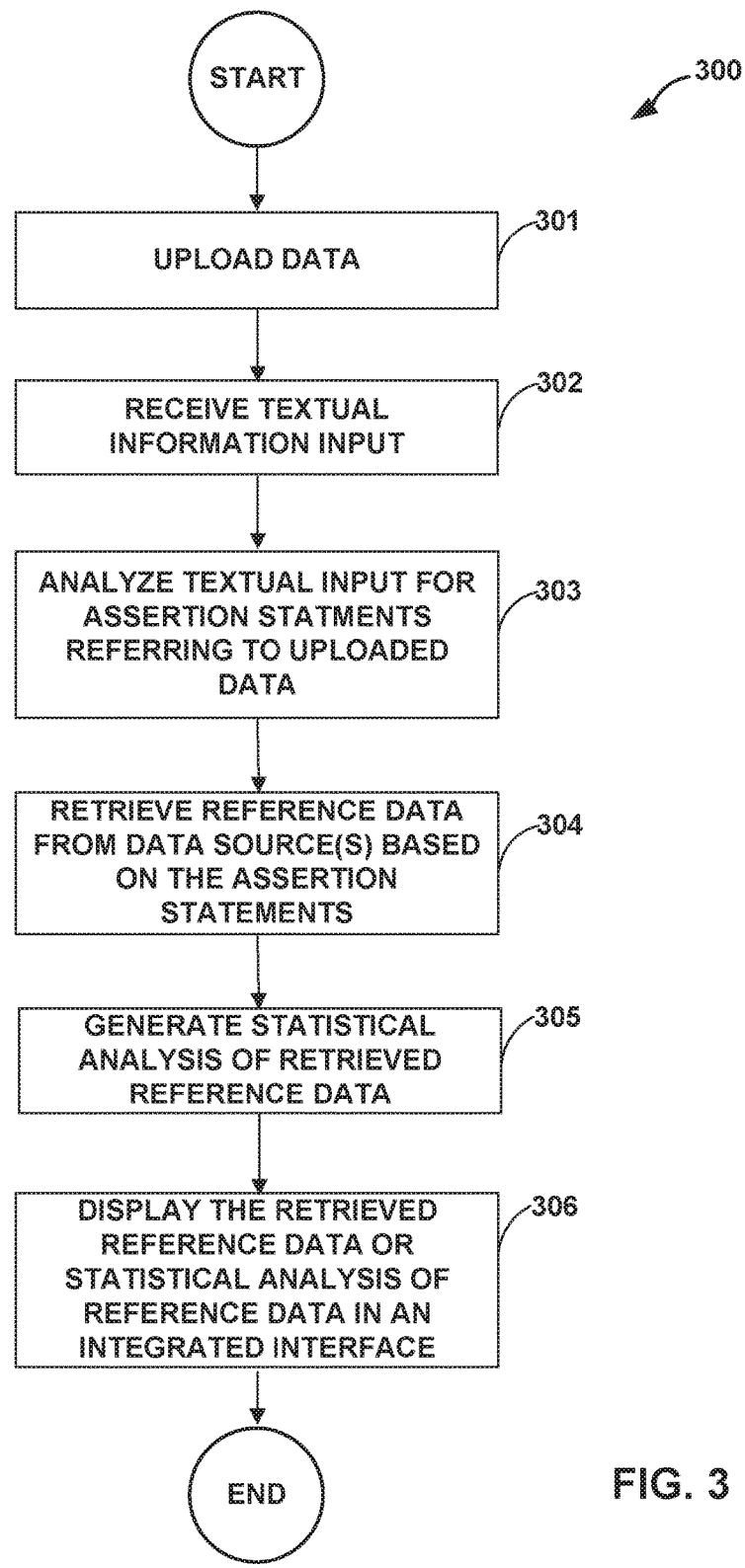
FIG. 3 depicts a flowchart of an example data analysis authoring method, in one aspect of this disclosure.

FIG. 3 depicts a flowchart of an example data analysis authoring method 300, in one aspect of this disclosure. User 8, such as an author, may interface with data analysis authoring system 22 to upload data to one or more data sources 14 (301) that user 8 may use in authoring an article or written composition. User 8 may then begin writing a composition by entering textual information input via interface module 24, such as authoring interface 32. As text is entered, data analysis authoring system 22 receives the entered textual information input (302). Analysis module 26 of data analysis authoring system 22 may also analyze the text information as it is entered for assertion statements 36 that may refer to data stored within data sources 14 (303). The analysis of the text information may include comparing the entered textual information input with the uploaded data in data sources 14 to determine the relevance of the assertion statements in relation to the uploaded data. Upon detecting one or more assertion statements 36, data analysis authoring system 22 may retrieve the referenced data from data sources 14 (304) that may refer to the assertion statements 36. Data analysis authoring system 22 may further generate statistical analysis of the retrieved reference data (305). This may include descriptive statistics that provide a concise summary of data and/or inferential statistics. Visualization module 28 of data analysis authoring system 22 may then display the referenced data and/or analysis of the referenced data as a graphical representation integrated with the authoring interface (306).

Figure 4:
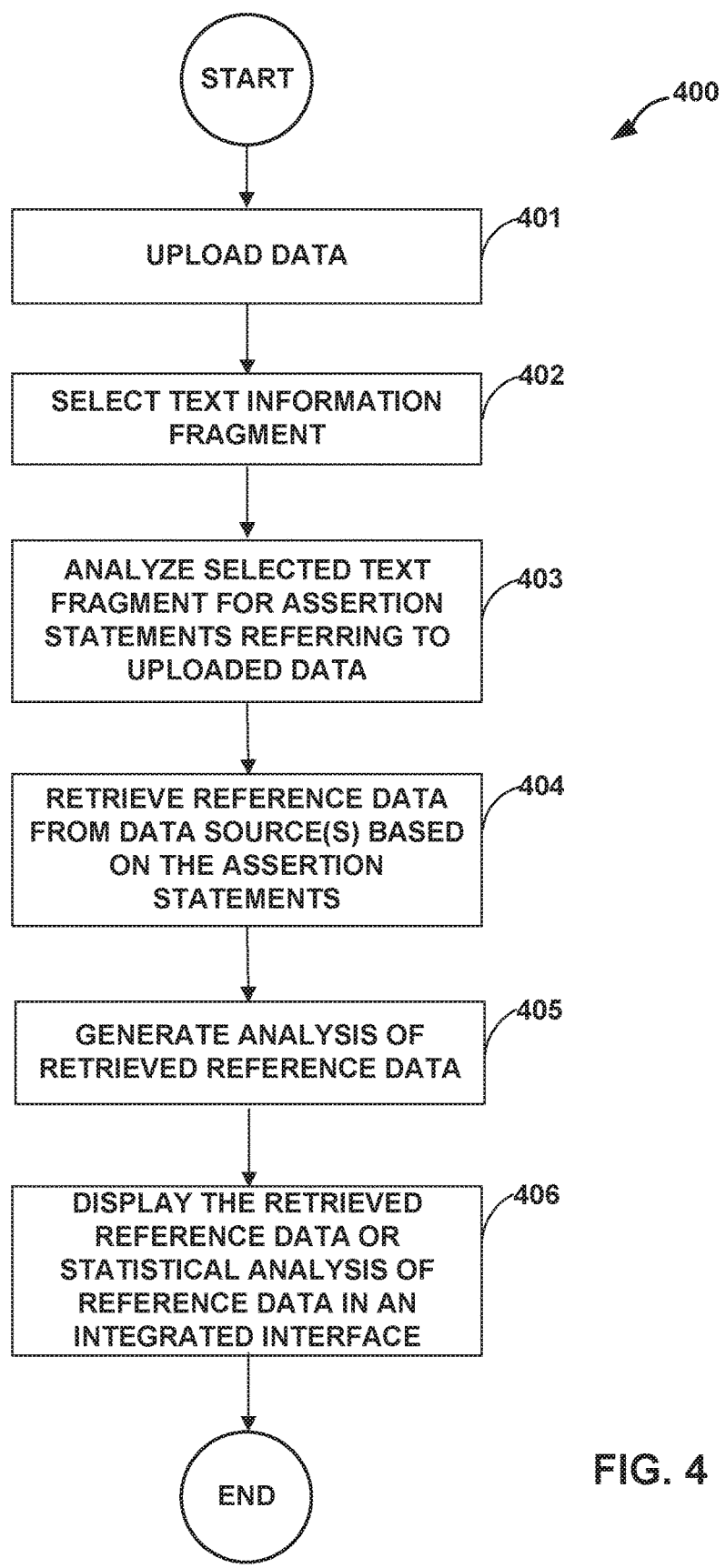
FIG. 4 depicts a flowchart of another example data analysis reviewing method, in one aspect of this disclosure.

FIG. 4 depicts a flowchart of another example data analysis reviewing method 400, in one aspect of this disclosure. User 8, such as an editor or reviewer, may interface with interface module 24 of data analysis authoring system 22 to upload data to one or more data sources 14 (401) that user 8 may use in reviewing a previously written article or written composition. For example, a reviewer may determine that a separate data source provides data that may further support or contradict the text information of the written article. User 8 may then select a textual information fragment via interface module 24, such as authoring interface 32 (402). The text information fragment may include a text or text grouping, such as a word, phrase, and/or sentence. As text is selected, analysis module 26 of data analysis authoring system 22 analyzes the selected text information fragment for assertion statements 36 that may refer to the data uploaded by the reviewer and/or the author (403). The analysis of the selected text information may include comparing the selected text information with the uploaded data in data sources 14 to determine the relevance of the assertion statements in relation to the uploaded data. Upon detecting one or more assertion statements 36, data analysis authoring system 22 may retrieve the referenced data from data sources 14 (404) that may refer to the assertion statements 36. Analysis module 26 of data analysis authoring system 22 may further generate statistical analysis of the retrieved reference data (405). This may include descriptive statistics that provide a concise summary of data and/or inferential statistics. Visualization module 28 of data analysis authoring system 22 may then display the referenced data and/or analysis of the referenced data as a graphical representation integrated with the authoring interface (406). Data analysis authoring system 22 may display the graphical representation of referenced data associated with the data uploaded by the reviewer with a graphical representation of data associated with the data uploaded by the author.

Figure 5:
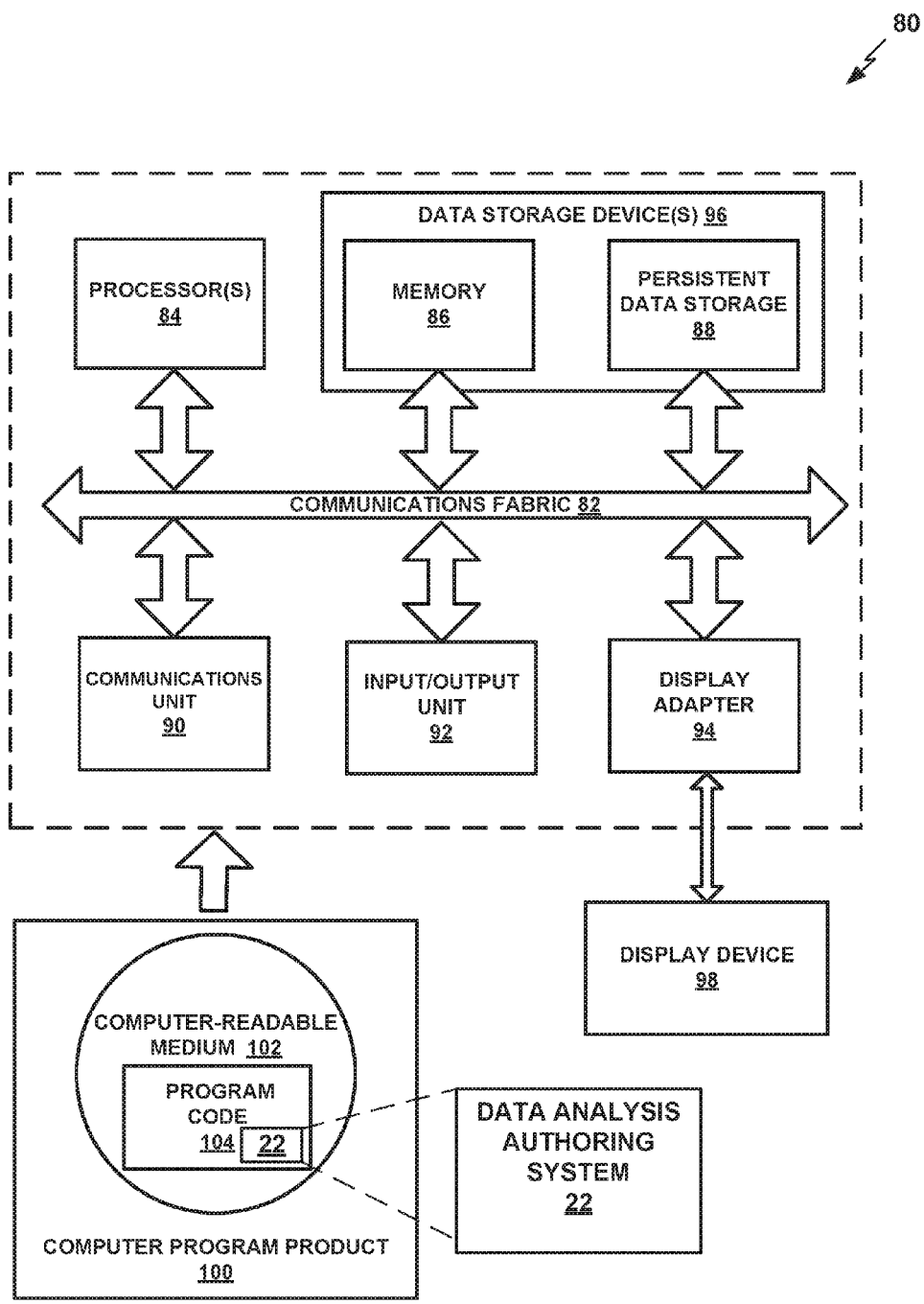
FIG. 5 depicts a block diagram of a computer program product that may be used to implement a data analysis authoring system, in one aspect of this disclosure.

FIG. 5 is a block diagram of a computing device 80 that may be used to implement data analysis authoring system 22, in one aspect of this disclosure. Computing device 80 may be a server such as one of web servers or application servers. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 5, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a data analysis authoring system 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below. In other embodiments, program code 104 need not include all of the program code for service data analysis authoring system 22, but may include at least program code of one or more of an interface module 24, an analysis module 26, and a visualization module 28.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which includes a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 including computer-executable instructions may be communicated or transferred to computing device 80 from computer-readable medium 102 through a hard-line or wireless communications link to communications unit 90 and/or through a connection to input/output unit 92. Computer-readable medium 102 including program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible mediums, such as communications links or wireless transmissions containing the program code 104. Program code 104 may be more or less temporarily or durably stored on any number of intermediate, physical computer-readable devices and mediums, such as any number of physical buffers, caches, main memory, or data storage components of servers, gateways, network nodes, mobility management entities, or other network assets, en route from its original source medium to computing device 80.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, with one or more processing devices, text information;
comparing, with the one or more processing devices, the received text information against a data source, wherein the comparing comprises applying natural language processing (NLP) to determine one or more assertion statements in the text information that references data from the data source, wherein comparing the received text information against the data source includes dynamically analyzing the received text information as the text information is received;
retrieving, with the one or more processing devices, the referenced data associated with the one or more assertion statements from the data source;
generating, with the one or more processing devices, a visual representation of the referenced data associated with the one or more assertion statements, wherein generating the visual representation comprises generating one or more statistical analyses of the referenced data for determining veracity of the one or more assertion statements, wherein the one or more statistical analyses comprise one or more inferential statistics from the referenced data; and
displaying, with the one or more processing devices, the visual representation, wherein the visual representation is integrated with an authoring interface.

2. The method of claim 1, wherein the data source comprises at least one of: a corpus, a body of works, a document, an article, a website, or a data collection.

3. The method of claim 1, wherein receiving the text information comprises receiving a user input selecting a text information fragment for review from among the text information.

4. The method of claim 1, wherein generating the visual representation comprises selecting from a group comprising one or more statistical analyses of the referenced data and one or more graphical representations of the referenced data from the data source.

5. The method of claim 1, wherein the visual representation is generated by a chart recommendation system.

6. The method of claim 1, further comprising:
providing, with the one or more processing devices, an interface to enable a user to perform at least one of: entering text, identifying the information source, changing text, adjusting the data source, or identifying a predetermined threshold of statistical correctness.

7. A computer system comprising:
one or more processors and one or more computer-readable memories, and one or more non-transitory computer-readable storage mediums;
program instructions, stored on at least one of the one or more storage mediums for execution by at least one of the one or more processors via at least one of the one or more memories, to receive text information;
program instructions, stored on at least one of the one or more storage mediums for execution by at least one of the one or more processors via at least one of the one or more memories, to compare the received text information against a data source, wherein the comparing comprises applying natural language processing (NLP) to determine one or more assertion statements in the text information that references data from the data source, wherein comparing the received text information against the data source includes dynamically analyzing the received text information as the text information is received;
program instructions, stored on at least one of the one or more storage mediums for execution by at least one of the one or more processors via at least one of the one or more memories, to retrieve the referenced data associated with the one or more assertion statements from the data source;
program instructions, stored on at least one of the one or more storage mediums for execution by at least one of the one or more processors via at least one of the one or more memories, to generate a visual representation of the referenced data associated with the one or more assertion statements, wherein the program instructions to generate the visual representation comprises program instructions to generate one or more statistical analyses of the referenced data for determining veracity of the one or more assertion statements, wherein the one or more statistical analyses comprise one or more inferential statistics from the referenced data; and program instructions, stored on at least one of the one or more storage mediums for execution by at least one of the one or more processors via at least one of the one or more memories, to display the visual representation, wherein the display is integrated with an authoring interface.

8. The computer system of claim 7, wherein the data source comprises at least one of: a corpus, a body of works, a document, an article, a website, or a data collection.

9. The computer system of claim 7, wherein the program instructions to receive the text information comprises program instructions to receive a user input selecting a text information fragment for review from among the text information.

10. The computer system of claim 7, wherein the program instructions to generate the visual representation comprises program instructions to select from a group comprising one or more statistical analyses of the referenced data and one or more graphical representations of the referenced data from the data source.

11. The computer system of claim 7, wherein the program instructions to generate the visual representation comprises program instructions to generate the visual representation by a chart recommendation system.

12. The computer system of claim 7, further comprising:
program instructions, stored on at least one of the one or more storage mediums for execution by at least one of the one or more processors via at least one of the one or more memories, to provide an interface to enable a user to perform at least entering text, identifying the information source, change text, adjust the data source, or identify the predetermined threshold of statistical correctness.

13. A computer program product comprising a non-transitory computer-readable storage medium having program code embodied therewith, the program code executable by a processor to:

receive text information;

compare the text information against a data source, wherein the comparing comprises applying natural language processing (NLP) to determine one or more assertion statements in the text information that references data from the data source, wherein comparing the received text information against the data source includes dynamically analyzing the received text information as the text information is received;

retrieve the referenced data associated with the one or more assertion statements from the data source;

generate a visual representation of the referenced data associated with one or more assertion statements, wherein the program code to generate the visual representation comprises program code to generate one or more statistical analyses of the referenced data for determining veracity of the one or more assertion statements, wherein the one or more statistical analyses comprise one or more inferential statistics from the referenced data; and display the visual representation, wherein the display is integrated with an authoring interface.

14. The computer program product of claim 13, wherein the data source comprises at least one of: a corpus, a body of works, a document, an article, a website, or a data collection.

15. The computer program product of claim 13, wherein the program code to receive the text information comprises program code to receive a user input selecting a text information fragment for review from among the text information.

16. The computer program product of claim 13, wherein the program code to generate the visual representation comprises program code to select from a group comprising one or more statistical analyses of the referenced data and one or more graphical representations of the referenced data from the data source.

17. The computer program product of claim 13, wherein the program code to generate the visual representation comprises program code to generate the visual representation by a chart recommendation system.

* * * * *